June 17, 1958  R. S. JOHNSON  2,838,957
ENGINE BALANCING MEANS
Filed June 14, 1954

Inventor
Ralph S. Johnson
By L. D. Burch
Attorney

United States Patent Office 2,838,957
Patented June 17, 1958

2,838,957

ENGINE BALANCING MEANS

Ralph S. Johnson, Royal Oak, Mich., assignor to General Motors Corporation, Detroit, Mich., a corporation of Delaware Application June 14, 1954, Serial No. 436,489

12 Claims. (Cl. 74—604)

The present invention relates to internal combustion engines and more particularly to a balance shaft adapted to be rotatably mounted in such an engine for balancing rotating couples that may develop during operation of the engine.

In certain types of engines, it is very difficult to completely dynamically balance all of the moving masses therein. This is particularly true in engines employing banks of cylinders having an odd number of cylinders in each bank such as the V-6 engine disclosed in United States Patent 2,632,340 entitled V-6 Engine by John Dolza et al. In engines of this nature the primary forces and couples may be compensated for by means of counterbalancing weights on the rotating crankshaft, and if it is desired to balance any secondary unbalance produced in the engine, a balance shaft may be provided in the engine. The balance shaft contains eccentric weights and is rotated at twice the speed of the engine to produce a rotating couple. In the past, such balance shafts have comprised a solid bar that is disposed adjacent the camshaft with a pair of eccentric weights mounted on the opposite ends of the bar. The weights project from the bar and are rotationally displaced 180° from each other.

Although rotation of such a balance shaft has been found effective for balancing a rotating couple, the rotation of the eccentrically disposed weights produces bending of the solid shaft. This bending will result in radial deflections of the shaft which may be a considerable magnitude, particularly at higher speeds. These deflections will cause the shaft to be bent into a somewhat S shape. This will result in the bar becoming out of axial alignment with the bearings supporting the bar thus imposing excessive loads on the bearings. These loads will in turn cause excessive wearing and premature failure of the bearings. In addition, if the bar is driven by a gear mounted on the shaft, the bending of the shaft will cause the gear to be deflected out of its plane of rotation. Thus the gears will be out of alignment and will not mesh properly. These factors will not only cause excessive wear but will also require more power to drive the shaft.

It is now proposed to provide a balance shaft in which the radial deflections of the weights will not cause any axial misalignment of the balance shaft. This is to be accomplished by mounting the weights inside of a hollow tube. The exterior of the weights are preferably disposed in spaced relation to the inner wall of the tube. This will permit a normal amount of radial deflection of the eccentric weights to occur as a result of the rotation of the weights. Thus as the balance shaft is rotated, the weights may be deflected radially without imposing any loads on the shaft. This in turn eliminates any deformation of the shaft itself. Therefore a balance shaft may be provided which may be maintained in axial alignment at all times so as to reduce bearing wear and timing gear misalignment.

In a balance shaft having a solid bar with weights projecting from the exterior thereof, it is necessary to provide clearance space for the weights to swing in. In addition, since the weights project from the outside of the shaft, it is diffcult to install the shaft in the engine. To mount such a shaft, it is necessary to make at least one of the weights easily removable or allow the bearings to be split for separation during mounting of the shaft. Either form of construction is cumbersome and expensive.

It is now proposed to provide a balance shaft which may be economically manufactured and easily installed in the engine. This is to be accomplished by employing a balance shaft fabricated from a hollow tube with the counterbalancing weights disposed inside of the tube. These weights may be in the form of a pair of semicylindrical members that are secured in the tube to extend axially thereof. The weights may be disposed in the opposite ends of the tubes and 180° from each other or on the opposite sides of the tube. Since all of the weights are positioned inside of the tube, the bearing surfaces may be formed directly on the exterior of the tube. This allows the weights to rotate within a circle smaller than the outside diameter of the exterior of the bearings. Since all of the revolving parts will be inside of the bearings, the shaft may be inserted axially through the bearings without requiring any of the parts to be detached for installation. It should also be noted that by placing the weights inside of the tube it is possible to employ weights having a considerably longer axial length. This will in turn permit employing weights having a considerably larger mass. Thus the diameter of the space for the rotation of the weights may be materially reduced and still obtain the same amount of couple. This will greatly facilitate the installation of the balance bar as it will eliminate the necessity of providing a larger diameter space for the swinging of a low mass counterweight turning on a large radius.

Figure 1:
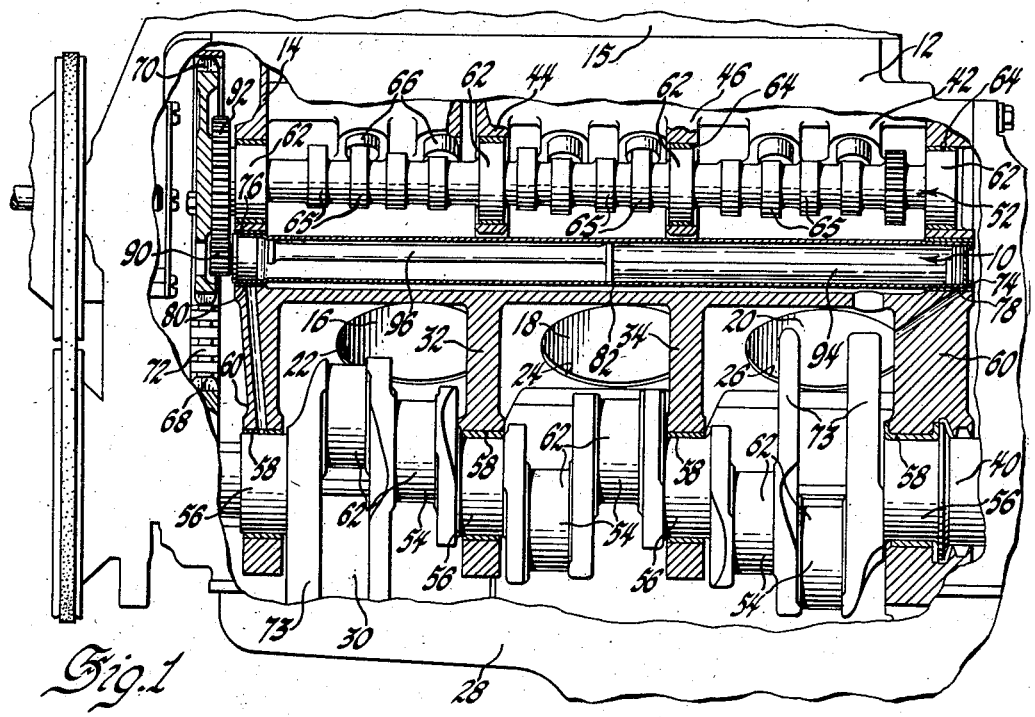
Fig. 1 is a side view of an engine with portions thereof being broken away to more clearly show a balance shaft embodying the present invention.
Figure 2:
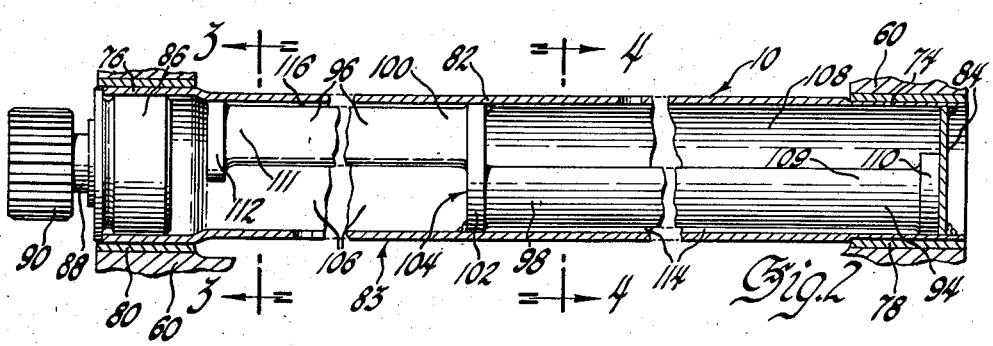
Fig. 2 is a cross sectional view of the balance shaft employed in engine of Fig. 1.
Figure 3:
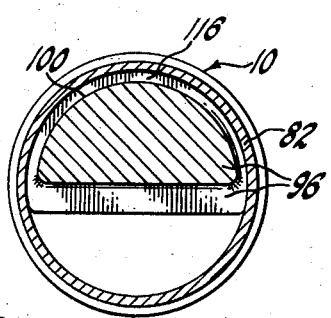
Fig. 3 is a cross sectional view taken substantially along the plane of line 3—3 of Fig. 2.
Figure 4:
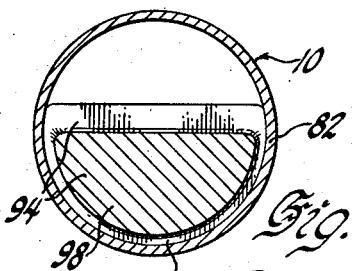
Fig. 4 is a cross sectional view taken substantially along the plane of line 4—4 in Fig. 2.

Referring to the drawings in more detail, the present invention may be embodied in a rotating balance shaft 10 adapted to be installed in an engine 12 for balancing out the secondary unbalance forces therein.

Although the engine 12 may be of any suitable design, in the present instance the engine 12 is of the so-called "V-type" having a cylinder block 14 with two angularly disposed banks of cylinders 15. Each of these banks may include three cylinder 16, 18 and 20 that form openings 22, 24 and 26 communicating with a space below the banks. This space may be enclosed by an oil pan 28 to form a crankcase 30. A plurality of webs 32 and 34 may extend transversely of this space for rotatably supporting the crankshaft 40 in the crankcase 30. A space may be provided between the banks to form a camshaft gallery 42. A plurality of webs 44 and 46 similar to those in the crankcase 30 may be provided in the gallery 42 for rotatably supporting the camshaft 52.

If desired, the chankshaft 40 may have a throw 54 for each cylinder 15. Thus, in a six cylinder engine the crankshaft 40 would have three pairs of throws, with each pair being separated by main bearings 56. The main bearings 56 on the chankshaft 40 are adapted to be positioned in the main bearing inserts 58 provided in the webs 32 and 34 and the end walls 60 of the block 14.

Thus there will be three pairs of throws 54 with the adjacent pairs being separated by the webs 32 and 34. The outer end of each throw 54 may be provided with a bearing 62 that is adapted to receive a bearing on the lower end of a connecting rod (not shown). The upper ends of the connecting rods may be connected to the reciprocating pistons in the cylinders 15. Thus the crankshaft 40 will be rotatably supported in the crankcase 30 by the main bearing inserts 58 and connected to the reciprocating pistons by means of the connecting rods.

In order to open and close the intake and exhaust valves, the camshaft 52 may be provided in the form of an elongated cylindrical bar. Plain bearings 62 may be formed on the ends and the middle thereof for rotatably supporting the camshaft 52. These bearings 62 may ride in bearing inserts 64 formed in the webs 44 and 46 and the end walls 60 of the block 14. A plurality of cams 65 including one pair for each cylinder 15 may be spaced axially along the camshaft 52. Each of these cams 65 have a cam surface thereon which slidably engages valve tappets 66. The tappets 66 in turn actuate push rods for opening and closing the intake and exhaust valves for each of the cylinders 15. In the present instance the camshaft 52 is driven from the crankshaft 40 by means of a gear train that includes a pair of timing gears 68 and 70 and a timing chain 72. One of these timing gears 68 is mounted on the forward end of the crankshaft 40 while the other timing gear 70 is mounted on the front end of the camshaft 52. The timing gears 68 and 70 are interconnected by a timing chain 72 which meshes with both gears so as to positively drive the camshaft 52. In a four cycle engine, the diameters of the timing gears 68 and 70 may be in the ratio of 1:2 so that the camshaft 52 will rotate at one-half the speed of the crankshaft 40.

Each of the pairs of throws 54 on the crankshaft 40 may be provided with counterweights 73. These counterweights 73 may be so positioned on the crankshaft 40 and of such size as to balance the primary forces produced by the reciprocating mass of the connecting rods and pistons. In order to balance the engine for primary rocking couples, a pair of counterweights (not shown) may be provided on the opposite ends of the crankshaft 40. These weights may be on the diametrically opposite sides of the crankshaft 40 or angularly displaced 180° from each other. Thus as the crankshaft 40 rotates these weights 72 will produce a rocking couple equal and opposite to the rocking couple produced by the engine 12. It therefore may be seen that all of the primary forces and couples may be compensated for by providing weights on the crankshaft 40.

The secondary rotating couples developed during operation of the engine 12 will have a frequency double that of the crankshaft 40 and if it is desired to balance them, it may be necessary to provide a secondary balance shaft 10 that rotates at twice the speed of the crankshaft or engine speed. In the present instance this balance shaft 10 is disposed in the bottom of the camshaft gallery 42 immediately below and parallel to the camshaft 52. The balance shaft 10 has bearings 74 and 76 at each end that rotatably ride in the bearings 78 and 80 formed in the end walls 60 of the block 10. The bearing 74 on the after end of the balance shaft 10 may have an outside diameter slightly reduced from the outside diameter of the center portion 82 of the shaft 10 and the bearing 76 on the forward end of the shaft 10 may be slightly larger in diameter than the center portion 82 of the shaft 10. This will give the balance shaft 10 a somewhat tapered exterior to facilitate inserting the shaft 10 axially through the bearings 78 and 80 from the forward end of the block 14 without requiring any parts to be disassembled.

In the present instance the balance shaft 10 comprises an elongated tubular member 83 having plugs 84 and 86 in each end so as to close the tube 83. The rear plug 84 may be of any suitable form and secured in place by any suitable means. The plug 86 in the forward end of the shaft 10 preferably carries an extension 88 for supporting a pinion gear 90. Although this pinion gear 90 may be driven from the crankshaft 40 by any suitable means, in the present instance it meshes with and is driven by a drive gear 92 on the forward end of the camshaft 52. This drive gear 92 is positioned on the camshaft 52 adjacent the timing gear 70 so as to rotate therewith.

Since the two timing gears 68 and 70 are drivingly connected together by the timing chain 72, they will both rotate in the same direction. Thus the camshaft 52 and the crankshaft 40 will both rotate in the same direction. However, since the pinion gear 90 on the forward end of the balance shaft 10 meshes directly with the drive gear 92, it will rotate counter to the drive gear 92 and cause the balance shaft 10 to rotate opposite to the crankshaft 40.

Although the camshaft 52 is normally driven at one-half engine speed, if the diameter of the pinion gear 90 is one-quarter that of the drive gear 92, the balance shaft 10 will rotate at four times the speed of the camshaft 52 or twice the speed of the crankshaft 40. Thus the period of the balance shaft 10 and the second rocking couples produced by the engine will be equal.

In order that rotation of the balance shaft 10 will produce a rocking couple, a pair of unbalance weights 94 and 96 may be carried by the shaft 10. These weights 94 and 96 may be disposed inside of the tube 83 eccentric to the axis of rotation and displaced longitudinally from the center of the shaft 10. This will place the center of mass of weights 94 and 96 on diametrically opposite sides of the shaft 10 or 180° apart. Thus rotation of the shaft 10 will cause a rocking couple to occur. Although these weights 94 and 96 may be one or more pieces of any desired shape in the present instance, each weight 94 and 96 is a semi-cylindrical member. The ends 98 and 100 of the weights 94 and 96 are secured together to form a unit handling assembly 104. A partition 102 may be provided at the junction of the ends 98 and 100. The partition 102 is a cylindrical disc which has a close fit on the inside of the tube 83 so as to prevent any radial movement thereof. This disc 102 may be secured to the tube 83 so as to separate the tube into two substantially equal compartments 106 and 108. The ends 109 and 111 of each weight 94 and 96 may have a semi-cylindrical disc 110 and 112 thereon which has a radius substantially the same as the interior of the tube 83. Thus the weight assembly 104 may be inserted axially into the tubular shaft 10 before the ends are closed by the plugs 84 and 86. The weights 94 and 96 may be secured in position by any suitable means such as welding the discs 102, 110 and 112 to the interior of the tube 83.

Although the weights 94 and 96 are preferably semi-cylindrical, the radius of their exterior is preferably slightly smaller than the inner radius of the tube 83. Thus the partition 102 and the discs 110 and 112 will support the eccentric weights 94 and 96 inside of the tube 83 and a clearance space 114 and 116 will be formed between the weights 94 and 96 and the inside of the tube 83.

During high speed rotation of the shaft 10 these weights 94 and 96, due to their eccentricity, will create a rocking couple which may be employed for balancing the secondary rocking couples in the engine. At the same time the centrifugal force of the weights 94 and 96 will cause them to be radially deflected. However, since the spaces 114 and 116 between the weights 94 and 96 and the interior of the tube 83 will permit this deflection without allowing the weights 94 and 96 to strike the tube 83, it can thus be seen that even though the weights 94 and 96 on the inside of the tube 83 are deflected radially outwardly out of axial alignment, the tube 83 will be maintained in axial alignment at all times. Thus the balance shaft 10 may be maintained in alignment with the bearings 78 and 80 at all times. Accordingly, the loads on the bearings 78 and 80 will be substantially uniform and the wear thereof will be greatly reduced. In addition, the end of the shaft 10 will not be deflected out of position. This will allow the gear 90 to remain in its plane of rotation at all times. This in turn will result in proper meshing engagement being maintained between gears 90 and 92.

It should be noted that maintaining the balance shaft 10 in alignment will not only reduce bearing wear and timing gear wear but it will also greatly reduce the amount of power required to drive the shaft 10.

It is to be understood that, although the invention has been described with specific reference to a particular embodiment thereof, it is not to be so limited since changes and alterations therein may be made which are within the full intended scope of this invention as defined by the appended claims.

What is claimed is:

1. A balance shaft adapted to be rotatably supported in an engine for balancing rotating couples produced during operation of said engine, said shaft comprising a tubular member having a passage extending longitudinally therethrough, a first weight eccentrically disposed in said passage and connected to said tubular member to rotate therewith, a second weight disposed in said passage and connected to said tubular member to rotate therewith, said second weight being longitudinally displaced from said first weight and eccentrically disposed on the diametrically opposite side of said passage.

2. A balance shaft adapted to be rotatably disposed in an engine for balancing rotating couples produced during operation of said engine, said shaft comprising a tubular member having a passage extending longitudinally therethrough, bearing surfaces formed on the ends of said shaft, a first weight eccentrically disposed in said passage adjacent one end thereof and connected to said tubular member to rotate therewith, a second weight eccentrically disposed adjacent the other end of said passage and connected to said tubular member to rotate therewith, said weights being on diametrically opposite sides of said passage.

3. A rotating balance shaft adapted to balance the rotating couples produced during operation of an engine having a rotating crankshaft, said balance shaft comprising a tubular member having a passage extending substantially longitudinally therethrough, a substantially semi-cylindrical weight eccentrically disposed in said passage adjacent one end thereof and connected to said tubular member to rotate therewith, a second weight similar to said first weight eccentrically disposed in said passage adjacent the opposite end thereof and connected to said tubular member to rotate therewith, said weights being on diametrically opposite sides of said passage, bearing surfaces formed on the opposite ends of said tubular member for rotatably supporting said shaft in said engine, the outside diameter of said bearings being at least as large as the diameter of said semi-cylindrical weight.

4. The balance shaft of claim 3 including plugs disposed in the opposite ends of said tube for closing said passage, at least one of said plugs having gear means thereon, said gear means being adapted to mesh with other gear means connected to said driveshaft for driving said balance shaft.

5. Weights adapted to be disposed inside a rotating balance shaft for rotation about an axis to produce a rotating couple, said weights comprising an elongated member adapted to be secured inside of said shaft to rotate therewith, a first substantially semi-cylindrical portion on one end of said member, said portion being disposed eccentrically about said axis, a second substantially semi-cylindrical portion axially spaced from said first semi-cylindrical portion, said second portion being disposed eccentrically about said axis, said portions being disposed on substantially diametrically opposite sides of said member and being adapted to be in spaced relation to said shaft so as to permit deflection of said elongated member without deflecting said shaft.

6. In an engine having a plurality of cylinders with pistons reciprocably disposed therein for driving a crankshaft, a pair of axially aligned bearings disposed substantially parallel to the crankshaft, a balance shaft having bearing surfaces formed on the opposite ends thereof for riding in said first bearings, weights eccentrically disposed inside of the opposite ends of said shaft and secured thereto to rotate therewith, gear means for driving connection with said crankshaft, the bearings adjacent one end of said shaft having an outside diameter at least as large as the outside diameters of said weights.

7. A balance shaft adapted to be rotatably supported in an engine for balancing rotating couples produced during operation of said engine, said shaft comprising a tubular member having a passage extending longitudinally therethrough, a first weight eccentrically disposed in said passage and connected to said tubular member to rotate therewith, a second weight disposed in said passage and connected to said tubular member to rotate therewith, said second weight being longitudinally displaced from said first weight and eccentrically disposed on the diametrically opposite side of said passage, the exterior of said weights being disposed in spaced relation to the surface of said passage.

8. A balance shaft adapted to be rotatably disposed in an engine for balancing rotating couples produced during operation of said engine, said shaft comprising a tubular member having a passage extending longitudinally therethrough, bearing surfaces formed on the ends of said shaft, a first weight eccentrically disposed in said passage adjacent one end thereof and connected to said tubular member to rotate therewith, a second weight eccentrically disposed adjacent the other end of said passage and connected to said tubular member to rotate therewith, said weights being on diametrically opposite sides of said passage, and the exterior of said weights being disposed in spaced relation to the surface of said passage.

9. A rotating balance shaft adapted to balance the rotating couples produced during operation of an engine having a rotating crankshaft, said balance shaft comprising a tubular member having a passage with a cylindrical inner wall extending substantially longitudinally therethrough, a substantially semi-cylindrical weight disposed in said passage adjacent one end thereof and having a semi-cylindrical exterior with a radius smaller than said inner wall and connected to said tubular member to rotate therewith, a second weight similar to said first weight eccentrically disposed in said passage adjacent the opposite end thereof and connected to said tubular member to rotate therewith, said weights being on diametrically opposite sides of said passage and extending longitudinally inwardly from said ends, said exteriors of said weights being radially spaced from said inner wall, bearing surfaces formed on the opposite ends of said tubular member for rotatably supporting said shaft in said engine, the outside diameter of said bearings being at least as large as the diameter of said semi-cylindrical weight.

10. The balance shaft of claim 9 including plugs disposed in the opposite ends of said tube for closing said passage, at least one of said plugs having gear means thereon, said gear means being adapted to mesh with other gear means connected to said drive shaft for driving said balance shaft.

11. Weights adapted to be disposed inside a rotating balance shaft for rotation about an axis to produce a rotating couple, said weights comprising an elongated member adapted to be secured inside of said shaft to rotate therewith, a first substantially semi-cylindrical portion on one end of said member, said portion being disposed eccentrically about said axis, a second substantially semi-cylindrical portion axially spaced from said first semi-cylindrical portion, said second portion being disposed eccentrically about said axis, said portions being disposed on substantially diametrically opposite sides of said member, shoulder means adjacent the center of said member between said semi-cylindrical portions, shoulder means on the outer ends of said member adjacent the ends of said portions, said first and second shoulder means projecting radially beyond the exterior of said semi-cylindrical portions to support the center portions of said weights in spaced relation to said shaft.

12. A balance shaft adapted to be rotatably supported on bearing means in an engine for balancing rotating couples produced during operation of said engine, a first weight eccentrically mounted inside of said shaft for rotation therewith, a second weight eccentrically mounted inside of said shaft longitudinally displaced from said first weight and on the diametrically opposite side of said shaft from said first weight for rotation therewith, and journal means on said shaft for riding in said bearing means, said weights being deflectable with respect to said journals as a result of rotation thereof.

References Cited in the file of this patent

UNITED STATES PATENTS

| | | |
|---|---|---|
| 1,164,367 | Lanchester | Dec. 14, 1915 |
| 1,390,464 | Senstius | Sept. 13, 1921 |
| 1,595,785 | Jackson | Aug. 10, 1926 |
| 1,898,459 | Newcomb | Feb. 21, 1933 |
| 2,182,988 | Iseler | Dec. 12, 1939 |
| 2,632,340 | Dolza | Mar. 24, 1953 |

FOREIGN PATENTS

| | | |
|---|---|---|
| 819,193 | France | July 5, 1937 |